(12) United States Patent
Schramm et al.

(10) Patent No.: US 7,032,496 B2
(45) Date of Patent: Apr. 25, 2006

(54) VACUUM SERVO BRAKE FOR A BOOSTER BRAKE SYSTEM FOR MOTOR VEHICLES

(75) Inventors: Horst Schramm, Lauter (DE); Rolf Seidi, Rugheim (DE); Joachim Hoch, Breitbrunn (DE)

(73) Assignee: FTE automotive GmbH & Co. KG, Ebern (DE)

( * ) Notice: Subject to any disclaimer, the term of this patent is extended or adjusted under 35 U.S.C. 154(b) by 157 days.

(21) Appl. No.: 10/667,792

(22) Filed: Sep. 22, 2003

(65) Prior Publication Data

US 2005/0166748 A1    Aug. 4, 2005

(30) Foreign Application Priority Data

Sep. 21, 2002 (DE) ................. 102 44 002

(51) Int. Cl.
*B60T 13/575* (2006.01)
(52) U.S. Cl. .................................. 91/369.2
(58) Field of Classification Search ........ 60/369.1, 60/369.2, 376 R
See application file for complete search history.

(56) References Cited

U.S. PATENT DOCUMENTS

| | | | |
|---|---|---|---|
| 3,110,031 A * | 11/1963 | Price ............ | 91/369.2 |
| 4,491,056 A * | 1/1985 | Tsubouchi ...... | 91/369.2 |
| 4,892,027 A | 1/1990 | Wagner et al. | |
| 5,345,855 A * | 9/1994 | Uyama .......... | 91/369.2 |
| 5,699,713 A | 12/1997 | Mortimer | |
| 5,873,296 A | 2/1999 | Shirahata | |
| 6,334,384 B1 * | 1/2002 | Hoerner ........ | 91/369.2 |
| 6,516,703 B1 * | 2/2003 | Stegmaier et al. ... | 91/369.2 |

FOREIGN PATENT DOCUMENTS

| | | |
|---|---|---|
| DE | 3930240 A1 | 10/1988 |
| DE | 3939499 A1 | 11/1989 |
| DE | 10028691 A1 * | 9/2001 |
| DE | 10113292 A1 | 9/2002 |
| EP | 0260169 A1 | 3/1988 |
| EP | 1090822 A2 | 9/2000 |
| EP | 1123849 A2 | 8/2001 |
| JP | 10-016757 A | 1/1998 |
| JP | 11278247 A * | 10/1999 |
| WO | WO 01/87681 A2 | 11/2001 |
| WO | WO 02/44001 A1 | 6/2002 |

* cited by examiner

*Primary Examiner*—Thomas E. Lazo
(74) *Attorney, Agent, or Firm*—Reising Ethington Barnes Kisselle P.C.

(57) ABSTRACT

A vacuum servo brake has an input member by which a valve arrangement may be acted upon at an input force to connect a working chamber selectively to the outside or to a vacuum chamber (separated from the working chamber by a piston which may be brought into operative connection with a main cylinder via an output member to generate a braking pressure). Provided on the piston is an elastomeric reaction member through which a reaction force may be applied to the input member. The output member has a stop which, with a predetermined input force, abuts against the working piston to alter an amplification ratio of the brake. Arranged adjacent to the reaction member is at least one volume take-up means into which part of the reaction member may be displaced in the event of the vacuum servo brake being actuated. Furthermore, the stop is preferably of resilient construction.

18 Claims, 4 Drawing Sheets

VACUUM SERVO BRAKE FOR A BOOSTER BRAKE SYSTEM FOR MOTOR VEHICLES

FIELD OF THE INVENTION

The present invention relates to a vacuum servo brake for a booster brake system for motor vehicles, as used in large numbers in the automotive industry.

BACKGROUND OF THE INVENTION

In a booster brake system in a motor vehicle, the energy required to generate the braking force comes from at least one energy supply device and—unlike the situation with a power-brake system—the physical force of the driver of the motor vehicle. To convert this energy, a vacuum servo brake connected between the brake pedal and the main cylinder in a serial or tandem arrangement is typically used. The vacuum servo brake has a working cylinder which is brought into operative connection with the main cylinder via an output member and separates a vacuum chamber from a working chamber. The vacuum servo brake furthermore has a control valve which is brought into operative connection with the brake pedal via an input member and selectively connects the vacuum chamber and the working chamber to one another or the latter to the outside. In motor vehicles having an internal combustion engine, the vacuum chamber is joined to the inlet manifold of the engine. In motor vehicles having a diesel engine, the vacuum is generated by a vacuum pump driven directly by the engine.

When the brake system is actuated in normal operation, the working chamber is connected to the outside via the control valve so that air at atmospheric pressure flows into the working chamber and a mixed pressure is established there. The force applied to the main cylinder by way of the brake pedal is in this case amplified by the force arising from the difference in pressure in the chambers, with the braking pressure built up in the main cylinder as a result of this force being transmitted back to the brake pedal by way of an elastomeric reaction member which is arranged in the vacuum servo brake between the input member and the output member. If the force applied to the brake pedal now increases continuously, the mixed pressure in the working chamber increases to atmospheric pressure, at which the maximum difference in pressure between the chambers prevails. An increase in the booster braking force is no longer possible; in this condition, also described as the trigger point of the vacuum servo brake, the working chamber of the vacuum servo brake is exhausted. A further increase in the braking pressure is only possible by way of an increase in the force applied to the brake pedal. When the brake pedal is lifted, the air at atmospheric pressure is drawn out of the working chamber via the control valve and the vacuum chamber, and the working piston returns to its original position, with the braking pressure in the main cylinder being let down. If the vacuum fails, only the force applied by way of the brake pedal acts on the main cylinder.

Vacuum servo brakes of this kind typically have a substantially constant amplification ratio, so that in the operating range of the vacuum servo brake, that is to say between the condition described as a sudden change in pressure, in which the input member connected to the brake pedal comes into abutment with the elastomeric reaction member over its entire surface and the servo support of the vacuum servo brake begins, and the trigger point of the vacuum servo brake mentioned above, the curve of the output force of the vacuum servo brake emitted by means of the output member or the braking force established in the main cylinder over the input force applied to the brake pedal is substantially linear. This substantially linear curve of the output force over the input force, constant in the operating range of the vacuum servo brake, is also known as a single rate characteristic.

It has been found that when vacuum servo brakes of this kind are used, the majority of drivers cannot achieve the full booster support of the vacuum servo brake even when they believe they have the brake full on. Tests have shown that the input force the driver applies to the brake pedal is often insufficient to allow the vacuum servo brake to reach its trigger point or is reduced too early so that the maximum available booster support is not fully utilised. Even pressing the partially depressed brake pedal again no longer improves the braking procedure in that case. As a result, not all the maximum possible braking pressure is applied, so that it is not possible to achieve the best possible braking distance. Even a motor vehicle with an anti-lock braking system (ABS device) cannot be decelerated in optimum manner if the driver does not depress the brake pedal decisively enough, as a result of which the braking distance is lengthened by a few meters which are often critical.

DESCRIPTION OF THE PRIOR ART

In the prior art (e.g. EP 0 705 190 B1 or EP 1 123 849 A2), for this reason vacuum servo brakes have already been proposed in which the amplification ratio alters in the operating range of the vacuum servo brake above a particular applied input force such that for a further increase in the output force only a relatively small increase in the input force is still required. If the output force is plotted against the input force in these vacuum servo brakes, the curve of the output force "kinks" upwards between the sudden change in pressure and the trigger point with the particular applied input force, so that in this case the curve of the output force has two substantially linear portions of different gradient, which is also described as a dual rate characteristic. This characteristic has the advantage that the braking force in the lower, flatter region of the characteristic can be applied in a properly measured manner with moderate input forces, giving a good pedal feel, whereas in the case of panic braking with high input forces, for example, the upper, steeper region of the characteristic is attained, in which a further increase in the input force results in an increase in the output force which is relatively large by comparison with the lower region of the characteristic, so that the maximum available booster support can also be fully utilised.

To be more precise, the generic document EP 0 705 190 B1 discloses a servo brake having a fluid-actuated servo piston whereof the supply of working fluid is controlled by a valve mechanism which is actuable under the action of a force input element actuated by the driver. In this case, the input element acts via a force transmission arrangement on an output element which is arranged such that in operation it delivers a servo-supported input variable to a main brake cylinder. This force transmission arrangement contains a reaction element, which is in the form of a solid cylindrical elastomer disc with quasi-hydraulic properties, received in a recess in the servo piston, and has surfaces via which the force is transmitted between the input element and the output element via the reaction element.

According to an essential aspect of this prior art, the force transmission arrangement additionally has a yielding means arranged on the input side or the output side and in the form of a spring which yields under a predetermined transmitted force in order to enable at least one part of the force transmission arrangement to move, as a result of which a change in the ratio between the operative surfaces on the reaction element is brought about in such a way that the amplification ratio is increased.

In an example embodiment (FIGS. 5 and 6) of EP 0 705 190 B1, the output element is constructed in two parts, with a first part which may be connected to the main brake cylinder and a second part which by means of a surface A2 abuts against the reaction element received in the servo piston. On the other side of the reaction element, the input element abuts by means of a surface A1 against the reaction element, this latter surface being smaller than the surface A2. Between the first part and the second part of the output element there is arranged a pressure spring as the yielding means. At the predetermined transmitted force, the pressure spring yields, with the result that the two parts of the output element can move towards one another. At the same time, the first part of the output element can come into abutment against the servo piston, so that the amplification ratio is increased from an initial A2:A1 to infinite, in other words the dual rate characteristic between the sudden change in pressure and the trigger point "kinks" away upwards out of the lower region of the characteristic in such a way that the upper region of the characteristic extends parallel to the ordinate. Although this indicates the switch-over point between the two characteristic regions to the driver on braking, hereupon the trigger point of the vacuum servo brake is suddenly reached unexpectedly, because it comes without any indication and with no feel from the pedal. A further disadvantage of this prior art can be seen in the fact that the additional spring brings about an undesirable additional cost in the mass production of vacuum servo brakes and also increases the susceptibility of vacuum servo brakes to malfunction.

The same applies to the vacuum servo brake known from JP 10-016757 A in which, as well, during emergency brake situations once that a predetermined input force has been reached an infinite amplification takes place due to a bridging of the elastomeric reaction element.

Furthermore, EP 1 123 849 A2 proposes a device for transmitting brake force with a dual rate characteristic which has an actuable input member, an output member for acting on a main brake cylinder with an amplification force, and a control valve arranged in a control housing, for regulating the amplification force. In this arrangement, arranged in the region of an elastomeric reaction member which is received in a cup-shaped receiving body integrated within the control housing is an axially movable thrust piece which is pretensioned in the direction of the reaction member by means of a spring and is supported against the input member or, via a coupling device, against the control housing and hence enables the force amplification ratio to be altered.

According to an essential aspect of this prior art, in the region of the input member a stop face for the reaction member is provided with at least one recess into which part of the reaction member can be displaced only at high reaction forces, as a result of which, following a change in the ratio of the operative surface area, a reaction braking force communicated to the-input member is reduced at the reaction member, or a braking force communicated to the output member is increased. In an alternative construction, the reaction member has, in the region of at least one preferably smooth stop face, a stepped shape, so that with small reaction braking forces a smaller part of the surface comes into abutment against a stop face on the input member side than with large reaction braking forces, at which the reaction member is deformed to a greater extent.

Although the device for transmitting braking force according to EP 1 123 849 A2 has the advantage over the prior art according to EP 0 705 190 B1 that the additional spring, which has to be of relatively large dimensions, of this last-mentioned prior art is avoided, one disadvantage of the teaching proposed in EP 1 123 849 A2 can be seen in the fact that, on actuation of the brake, the reaction member always lies in the full flow of force between the control housing and the output member, over the complete operating range of the device for transmitting braking force between the sudden change in pressure and the trigger point, which may, in particular in the event of deformations of the reaction member in the region of the stop face recess on the input member or the stepped shape of the reaction member on the input member side, lead to premature damage to the reaction member and associated functional disruptions or a failure of the device for transmitting braking force.

Taking as a starting point the prior art according to EP 0 705 190 B1, the object of the invention is to provide a vacuum servo brake with dual rate characteristic which is of as simple as possible a construction and also avoids the functional disadvantages of the prior art described above.

SUMMARY OF THE INVENTION

According to the invention, in a vacuum servo brake for a booster brake system for motor vehicles, having an input member, by means of which a valve arrangement may be acted upon at an input force (F) in order to connect a working chamber selectively to the outside or to a vacuum chamber which is separated from the working chamber by a working piston which may be brought into operative connection with a main cylinder via an output member in order to generate a braking pressure (p) and on which there is provided an elastomeric reaction member through which a reaction force dependent on the braking pressure may be applied to the input member, in which the output member has a stop which, in the event of a predetermined input force (F), comes into abutment against the working piston to alter an amplification ratio of the vacuum servo brake; wherein, arranged adjacent to the reaction member is at least one volume take-up means into which part of the reaction member may be displaced in the event of the vacuum servo brake being actuated, and wherein at least one of the stop and the working piston is of resilient construction in a region in which the stop abuts so that, when the stop abuts against the working piston, a relative movement between the output member and the working piston is still possible.

Because there is arranged adjacent to the reaction member at least one volume take-up means into which part of the reaction member may be displaced in the event of the vacuum servo brake being actuated, a relative movement between the stop and the working piston is possible, so that the stop can come into abutment against the working piston in order to alter the amplification ratio of the vacuum servo brake. In contrast to the teaching of EP 1 123 849 A2, the at least one take-up means does not therefore serve to substantially alter the operative surface area on the input member side as in accordance with this prior art, but, as a result of taking up part of the elastomeric reaction member displaced or flowing away as the vacuum servo brake is actuated, serves first to allow the stop of the output member to come close to the working piston, until the stop of the output member comes into abutment, during the predetermined input force applied via the input member, against the working piston. As the stop of the output member abuts against the working piston, the internal amplification ratio of the vacuum servo brake changes, that is to say the characteristic thereof "kinks" upwards as described above. From this point in time onwards and in advantageous manner, the reaction member moreover no longer lies in the full flow of the force, with the result that there is a smaller risk of damage to the reaction member than in the prior art according to EP 1 123 849 A2.

Because the stop and/or the working piston is furthermore of resilient construction in the abutment region for the stop, when the stop abuts against the working piston a relative movement between the output member and the working piston is still possible. As a result of this construction of the vacuum servo brake, when the stop of the output member is in abutment against the working piston, as the input force is further increased an infinite amplification ratio does not begin, in contrast to the disclosure of EP 0 705 190 B1, that is to say the upper region of the dual rate characteristic attained does not extend parallel to the ordinate but only reaches a greater gradient by comparison with the lower region of the characteristic, with the result that sufficiently good pedal feel is still available for the driver in the upper region of the characteristic. In the upper region of the dual rate characteristic that is attained, too, part of the reaction member can here still be displaced into the at least one volume take-up means, that is to say that the reaction member can be compressed further with a further reduction in thickness, with part thereof flowing into the at least one volume take-up means.

Finally, a further advantage of the construction of the vacuum servo brake according to the invention by comparison with the prior art described at the outset can be seen in the fact that, in the series arrangement of the input member, the reaction member/working piston and the output member and stop, no complicated additional spring elements are provided, which simplifies the structure and manufacture of the vacuum servo brake as a whole and reduces its susceptibility to malfunction and its construction costs.

The position, number, size and/or geometry of the (singular or plural) volume take-up means, in conjunction with the material properties of the elastomeric, rubber-like elastic reaction member, and in accordance with the respective requirements, allow an influence to be exerted in a simple way on the flow and compressive behaviour of the reaction member and hence on both the gradient of the dual rate characteristic and the position of the switch-over point at which the dual rate characteristic "kinks" upwards. Thus, at least one volume take-up means may be provided on the output member. If in this case the output member has, in a construction which is simple from a manufacturing engineering point of view, a shoulder which abuts against the reaction member by means of an end face and whereof the external peripheral face delimits an annular free space as the volume take-up means, then on construction of the free space by for example turning the output member it becomes possible at the same time to influence the size of the end face of the shoulder abutting against the reaction member, as a further variable influencing the amplification ratio of the vacuum servo brake.

With this construction of the output member, it is advantageous if the output member is provided between the end face and the external peripheral face of the shoulder with a ramp which on the one hand favors the flow and compression of the reaction member when the vacuum servo brake is actuated and on the other hand further reduces the risk of damage to the reaction member by comparison with a sharp edge between the end face and the external peripheral face of the shoulder.

In addition or as an alternative to the arrangement of at least one volume take-up means on the output member side, at least one volume take-up means may be provided on the reaction member, which is particularly easy to implement. Thus, the reaction member may be a disc which—in the undeformed condition—is substantially cylindrical and on the external periphery whereof a peripheral recess is made as the volume take-up means. If the peripheral recess in this case has—in the undeformed condition—a semicircular cross-section, this in turn is favorable to the flow and compression of the reaction member under load.

A further, advantageously simple embodiment of a volume take-up means on the reaction member side is possible, in accordance with which the reaction member is—in the undeformed condition—a disc which is bevelled in the shape of a truncated cone towards at least one of its end faces, in order to form an annular free space as the volume take-up means.

In principle, it is possible to provide a volume take-up means or free space on one side of the reaction member, that is to say on the input side or on the output side. In this connection, trials by the Applicant have shown that with otherwise identical installation conditions arranging the free space on the output side of the reaction member results in a switch-over point of the dual rate characteristic at a lower input force than is the case with an arrangement of the free space on the input side of the reaction member. If no influence on the characteristic caused by the alignment of the reaction member is desired or if an undesired influence here is to be eliminated, a construction is useful, in which the reaction member is—in the undeformed condition—a disc which is constructed to be symmetrical about a notional plane parallel to its end faces, which makes it possible to mount the reaction member in either direction.

It is particularly advantageous if when the vacuum servo brake is assembled the stop is adjustable with respect to its axial position. In this way, it then becomes possible to act on the vacuum servo brake, which is assembled to be functional apart from the stop or the output member, under installation conditions, that is to say with a vacuum applied via the input member at a predetermined input force at which the dual rate characteristic is to "kink" upwards, and then to adjust the stop such that it comes into abutment against the working piston at this input force. This procedure has the substantial advantage that any tolerances of the components involved as regards shape, position and material are automatically compensated and hence have no influence on the position of the switch-over point of the dual rate characteristic.

The output member may be a plunger which has a plunger shaft which may be brought into operative connection with the main cylinder and a resiliently yieldable plunger plate abutting against the reaction member, with the stop being constructed as an annular collar mounted on the plunger plate. This construction is advantageous among other things in that no additional components are required for the stop, but rather the stop is constructed in one piece with the output member. The desired spring action of the plunger plate may in this case be adjusted or influenced by a suitable choice of thickness for the plunger plate.

An embodiment of the stop which provides an alternative hereto is specified by an example in which the output member is a plunger which has a plunger shaft which may be brought into operative connection with the main cylinder and a plunger plate abutting against the reaction member, with the stop being constructed as a resiliently yieldable collar part secured to the plunger shaft. In particular if the collar part in this case has a sleeve portion which is provided with an internal thread, is screwed onto an external thread made on the plunger shaft and away from which an annular, resiliently yieldable collar portion extends, it is particularly simple to make an adjustment of the stop with respect to its axial position when the vacuum servo brake is assembled.

As a result of the two-part construction of the stop and the output member indicated, it is furthermore possible to use for each of these components other materials in accordance with the respective requirements, with it being advantageously possible for the collar part to be made from spring steel.

The working piston may have an insert part for receiving the reaction member, with the insert part also being constructed for the purpose of guiding the input member and the output member and having an abutment face for the stop. An insert part of this kind, which fulfils a plurality of functions in an advantageous manner, may be used unchanged for different vacuum servo brakes having, among other things, working pistons of different sizes, and thus makes economic modular solutions possible.

Finally, the reaction member may be lubricated with a lubrication paste and/or to be provided with a lubricant coating and/or to have non-stick agent mixed with the elastomer of the reaction member. As a result of these measures, the flow and compressive behaviour of the reaction member are improved because only relatively low friction forces impeding the flow and compression of the reaction member occur on the surfaces against which the reaction member is pressed under load, because the friction coefficients are reduced by the above measures. Moreover, these measures have the effect that the hysteresis of the dual rate characteristic becomes narrower, that is to say the course of the characteristic when the vacuum servo brake is relieved of load matches better the course of the characteristic when the vacuum servo brake is loaded, because the reaction member, which has a restoring capability inherent in the elastomer, can be deformed back more quickly or more effectively because of the lower friction forces. The result is therefore an improved pedal feel with a more finely tuned possibility of modulating the braking pressure, in particular if the brake pedal acting on the input member is relieved of its load only temporarily during the braking procedure and is then put under load again relatively quickly.

BRIEF DESCRIPTION OF THE DRAWINGS

The invention will be explained in more detail below by way of preferred example embodiments, with reference to the attached, in some cases diagrammatic, drawings, in which.

DESCRIPTION OF THE PREFERRED EMBODIMENTS

At this point it should first of all also be noted in connection with the drawings that all the rubber-like elastic components of the vacuum servo brakes shown have been illustrated in the undeformed condition, to simplify the illustration.

Figure 1:
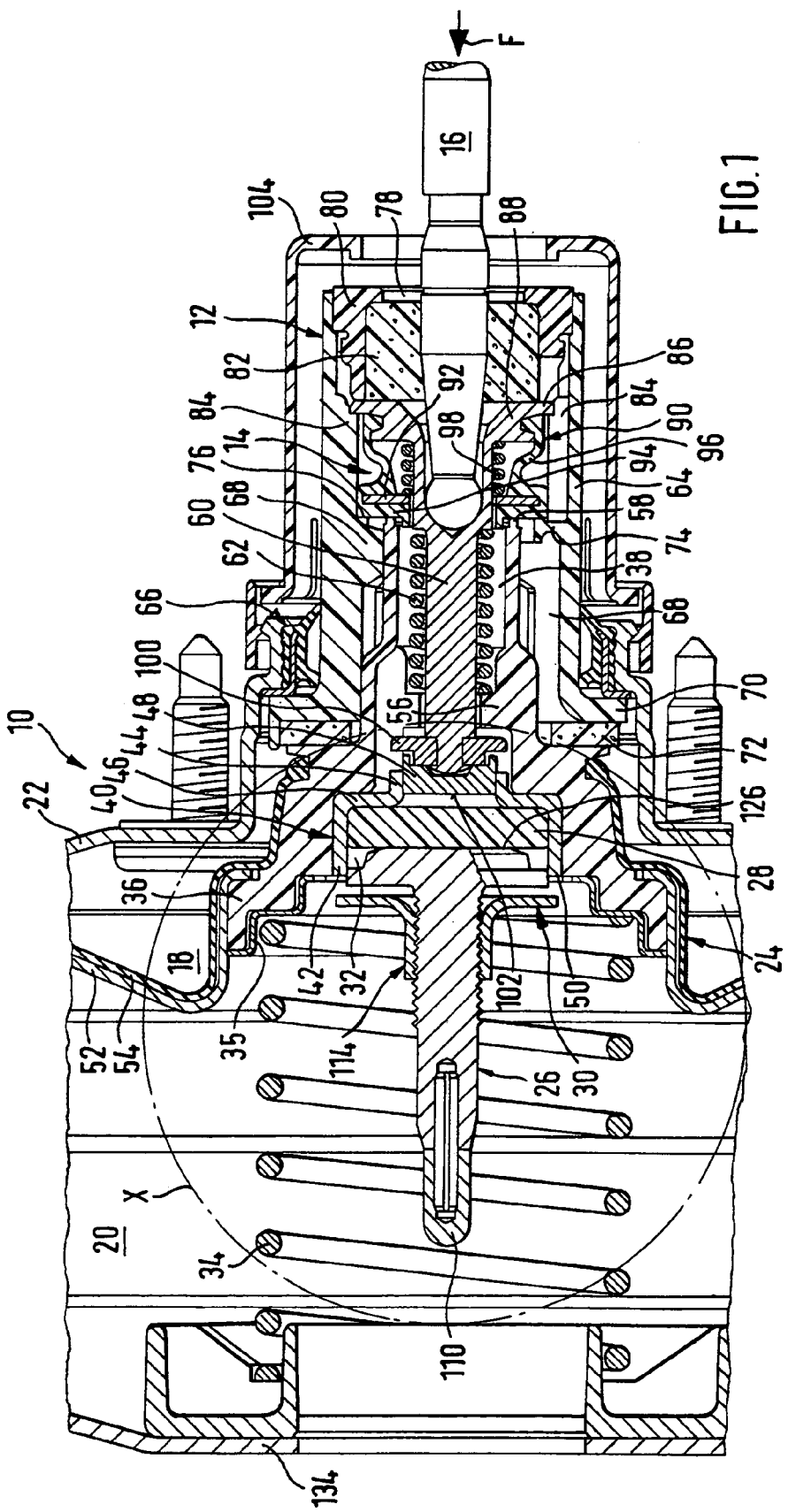
FIG. 1 shows a partial view in longitudinal section of a vacuum servo brake, in a first example embodiment.

FIG. 1 shows a vacuum servo brake 10 with no response travel, of a booster brake system for motor vehicles, which may be connected on its left-hand side as seen in FIG. 1, that is to say on the output side, to a main cylinder in a serial or tandem arrangement and on its right-hand side as seen in FIG. 1, that is to say on the input side, to a brake pedal. The main cylinder, which is connected to the wheel brake cylinders in conventional manner, and the brake pedal are constructed as known in the prior art and are not illustrated in the figures, for reasons of clarity. The vacuum servo brake 10 itself is only shown to the extent that appears necessary to understand the present invention.

The vacuum servo brake 10 has as the input member a control piston 12 by means of which a valve arrangement 14 may be acted upon via a piston rod 16, articulated to the brake pedal (not shown), at an input force F, in order to connect a working chamber 18 selectively to the outside or to a vacuum chamber 20. The vacuum chamber 20 is separated from the working chamber 18 in a housing 22 by a working piston 24 which can be brought into operative connection with the main cylinder (not illustrated) in order to generate a braking pressure p via an output member in the form of a plunger 26. Provided on the working piston 24, in a manner which will be described below, is a reaction member in the form of an elastomeric, rubber-like elastic reaction disc 28 via which a reaction force dependent on the braking pressure can be applied to the control piston 12 and hence may be felt at the brake pedal. Furthermore, attached to the plunger 26 is a stop 30 which comes into abutment against the working piston 24 in the event of a predetermined input force F in order to alter an amplification ratio of the vacuum servo brake 10. The essential point is that, as will be explained in more detail below, at least one volume take-up means or free space 32 is arranged adjacent to the reaction disc 28 and part of the reaction disc 28 can be displaced into this in the event of the vacuum servo brake 10 being actuated, and that the stop 30 and/or the working piston 24—if the geometry is reversed, in a manner not shown here—is constructed to be resilient in the region of abutment of the stop 30 so that, when the stop 30 abuts against the working piston 24, a relative movement between the output member 26 and the working piston 24 is still possible.

The working piston 24, which is pre-tensioned to the right, as seen in FIG. 1, relative to the housing 22 by means of a restoring spring 34 arranged in the vacuum chamber 20, has a control housing 36 of synthetic material which is reinforced by a spring disc 35 and in which a stepped through hole 38 is made. Fixedly inserted into the through hole 38 is a metal, preferably drawn, insert part 40 which has two hollow cylindrical portions 42, 44 of different diameters, which are connected to one another by way of an annular shoulder portion 46. The hollow cylindrical portion 42 of the insert part 40 of the working piston 24 which is of larger diameter and is on the left as seen in FIG. 1 serves to receive with radial form fit the reaction disc 28, which abuts against the annular shoulder portion 46 of the insert part 40, and at the same time to guide radially the plunger 26, whereas the hollow cylindrical portion 44 of the insert part 40 which is of smaller diameter and is on the right as seen in FIG. 1 serves to guide radially a transmission disc 48 associated with the control piston 12. In the example embodiment illustrated, the annular end face 50 of the insert part 40 which is on the left as seen in FIG. 1 moreover forms an abutment face for the stop 30 on the plunger 26.

A metal diaphragm disc 52 is secured radially externally to the control housing 36 of the working piston 24, so that the control housing 36, the insert part 40 and the diaphragm disc 52 form a unit which is movable in the housing 22 in the axial direction of the vacuum servo brake 10. Abutting with pneumatic sealing against the external periphery of the working piston 24 is a resilient diaphragm 54 which is also secured with pneumatic sealing at its external periphery to the housing 22 (not illustrated).

Not shown in FIG. 1, because they do not lie in the plane of section illustrated there, are connection channels which are made in the control housing 36 of the working piston 24 around the insert part 40 and serve constantly to connect the vacuum chamber 20 pneumatically to the region of the through hole 38 lying on the right of the insert part 40, as seen in FIG. 1. The working piston 24 is furthermore provided on the internal periphery of the through hole 38 in the control housing 36 with a plurality of longitudinal ribs 56 which serve among other things to stiffen the control housing 36. Finally, the end face of the control housing 36 which is on the right as seen in FIG. 1 forms an annular first valve seat 58 of the valve arrangement 14.

The control piston 12, which is movable both in the axial direction of the vacuum servo brake 10 and relative to the working piston 24, has a thrust piece 60 which is attached to the piston rod 16 and penetrates into the through hole 38 in the control housing 36 of the working piston 24. The thrust piece 60 is braced with respect to the longitudinal ribs 56 of the control housing 36 by means of a valve spring 62 of the valve arrangement 14, this valve spring being arranged on the external periphery of the thrust piece 60 in the through hole 38 of the control housing 36, and the longitudinal ribs 56 of the control housing 36 guide the thrust piece 60 on the external periphery thereof. As a result, the valve spring 62 acts on the control piston 12 with a force which tends to push the control piston 12 away from the working piston 24.

The control piston 12 furthermore has a hollow cylindrical sleeve 64 of synthetic material which is guided with pneumatic sealing on its external periphery in a sealing arrangement 66 provided on the housing 22. The sleeve 64 has on the internal periphery of its left-hand end, as seen in FIG. 1, a plurality of narrow longitudinal ribs 68 which are distributed uniformly in the peripheral direction and by which the sleeve 64 is guided on the external periphery of the control housing 36 of the working piston 24.

A collar 70 made on the left-hand end of the sleeve 64, as seen in FIG. 1, and extending radially outwards cooperates with the sealing arrangement 66 to serve as a stop to prevent the control piston 12 from being withdrawn from or pressed out of the housing 22. Between the left-hand end face, as seen in FIG. 1, of the collar 70 of the sleeve 64 and the right-hand end face, as seen in FIG. 1, of the control housing 36 of the working piston 24 opposite there is arranged a resilient filter part 72 which is permeable to air and, when the vacuum servo brake 10 is in operation, serves to reduce the noise of flow.

Adjoining the longitudinal ribs 68, the sleeve 64 furthermore has a substantially central and radially inwardly extending collar 74, and on the side thereof remote from the working chamber 18 there is provided an annular shoulder which forms a second valve seat 76 of the valve arrangement 14, this valve seat 76 having a larger diameter than the first valve seat 58.

Secured to the right-hand side, as seen in FIG. 1, of the sleeve 64, on the internal periphery thereof, there is an end piece 80 of synthetic material which is provided with a stepped bore 78 passing all the way through in the axial direction of the vacuum servo brake 10. A further air-permeable filter part 82 is attached within the portion of the stepped bore 78 of larger diameter and abuts snugly against the piston rod 16 guided through the stepped bore 78. Between the left-hand end, as seen in FIG. 1, of the end piece 80 and the further longitudinal ribs 84 of the sleeve 64 which adjoin the collar 74 to the right as seen in FIG. 1, an annular portion 86 of an end collar 88 of the thrust piece 60 is received in such a way that the end piece 80 keeps the sleeve 64 form-fittingly against the thrust piece 60. As a result, the thrust piece 60, the sleeve 64 and the end piece 80 provided with the filter part 82 are displaceable on the piston rod 16 as a unit in the axial direction of the vacuum servo brake 10.

The valve arrangement 14, which forms a double-seat valve and is also described as a servo valve, furthermore has a resilient valve part 90 which is arranged in the axial direction of the vacuum servo brake 10 between the collar 88 of the thrust piece 60 and the valve seats 58, 76 and is stiffened by means of a perforated disc 92. On the side of the disc 92 facing the valve seats 58, 76, the valve part 90 has a sealing portion 94 that cooperates with the valve seats 58, 76, and on the opposite side of the disc 92 it has a bellows portion 96 which is secured to the collar 88 of the thrust piece 60 with the aid of the longitudinal ribs 84 of the sleeve 64. The bellows portion 96 surrounds a further valve spring 98 which is arranged on the external periphery of the thrust piece 60 and is supported on its right-hand side, as seen in FIG. 1, against the collar 88 of the thrust piece 60 and pre-tensions the valve part 90 in the direction of the valve seats 58, 76 in abutment against the disc 92.

When the sealing portion 94 of the valve part 90 abuts against the radially external second valve seat 76, while being axially spaced from the radially internal first valve seat 58, then the vacuum chamber 20 is connected by way of the connection channels (not shown) in the control housing 36 of the working piston 24, the channels formed by the longitudinal ribs 56 in the through hole 38 in the control housing 36, the annular gap between the first valve seat 58 and the sealing portion 94 of the valve part 90 and the channels formed by the longitudinal ribs 68 of the sleeve 64 by way of the filter part 72 to the working chamber 18.

When, by contrast, the sealing portion 94 of the valve part 90 abuts against the first valve seat 58, while being axially spaced from the second valve seat 76, then the working chamber 18 is connected by way of the filter part 72, the channels formed by the longitudinal ribs 68 of the sleeve 64, the annular gap between the second valve seat 76 and the sealing portion 94 of the valve part 90, the channels formed by the longitudinal ribs 84 of the sleeve 64 and the filter part 82 in the stepped bore 78 of the end piece 80 to the outside. In the driving position of the vacuum servo brake 10, illustrated in FIG. 1, the sealing portion 94 of the valve part 90 abuts against both valve seats 58, 76, with the result that the valve arrangement 14 separates the vacuum chamber 20 from the working chamber 18 and the latter from the outside.

Finally, a thrust disc 100 is secured to the left-hand side, as seen in FIG. 1, of the thrust piece 60, in the example embodiment illustrated by means of a rivet connections On the left-hand side, as seen in FIG. 1, of the thrust disc 100, the transmission disc 48 abuts loosely against the thrust disc 100 for reasons associated with assembly. In the driving position of the vacuum servo brake 10, illustrated in FIG. 1, the transmission disc 48, which is guided to be movable in the axial direction of the vacuum servo brake 10 on its cylindrical external periphery in the hollow cylindrical portion 44 of the insert part 40 which is smaller in diameter, is spaced from the reaction disc 28 by a small amount by means of its (in the example embodiment illustrated) planar end face 102 facing the reaction disc 28.

It still remains to be noted with respect to the general structure of the vacuum servo brake 10 that in order to protect the contact face of the sleeve 64, which is made on the external periphery of the sleeve 64 of the control piston 12 and cooperates with the sealing arrangement 66 on the housing 22, a protective sleeve 104 which concentrically surrounds the sleeve 64 and is secured to the housing 22 is provided.

Figure 2:
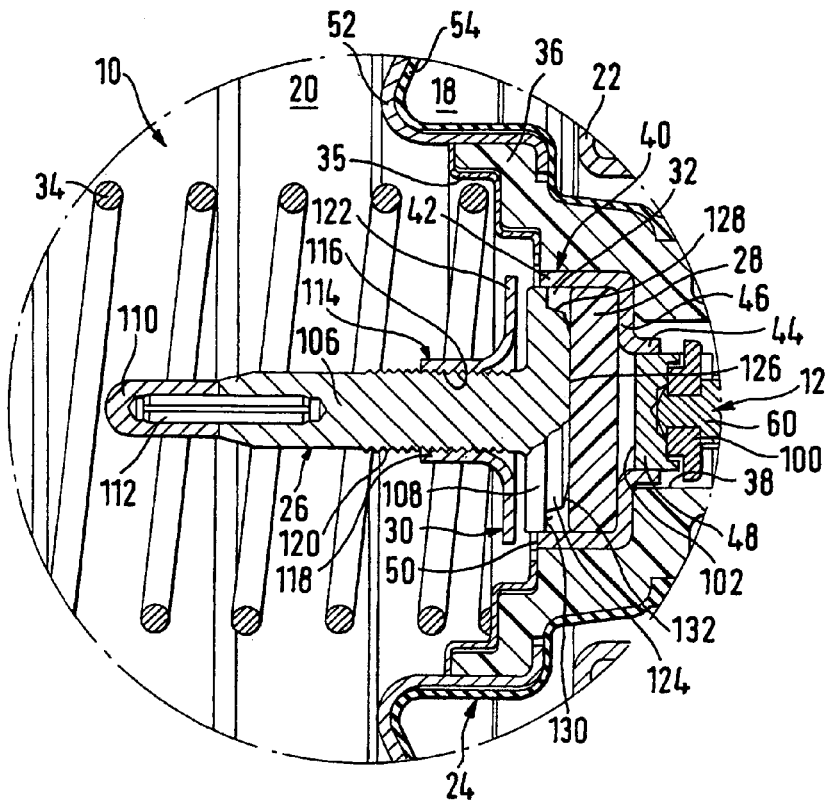
FIG. 2 shows an enlarged illustration of the detail X in FIG. 1.

FIG. 2 shows further details of the volume take-up means or free space 32 which has already been discussed at the outset and is provided adjacent to the solid cylindrical reaction disc 28 in the example embodiment illustrated, and into which part of the reaction disc 28 may be displaced in the event of the vacuum servo brake 10 being actuated, and of the resilient construction of the stop 30 provided on the plunger 26.

Figure 3:
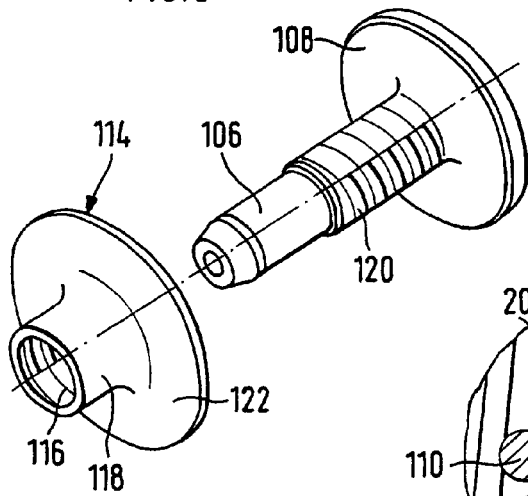
FIG. 3 shows a plunger, on the output side, and a collar part of the vacuum servo brake which may be fixed thereto at a defined point and forms a resilient stop for the working piston of the vacuum servo brake, in accordance with the first example embodiment, in a perspective exploded illustration.

According to FIGS. 2 and 3, the plunger 26 has a metal plunger shaft 106, whereof the right-hand end, as seen in FIG. 2, is adjoined in a one-piece construction by a plunger plate 108 which abuts against the reaction disc 28. Secured to the left-hand end, as seen in FIG. 2, of the plunger shaft 106 by means of a clamping sleeve 112 or a screw is a hardened thrust cap 110 by way of which the plunger. 26 can be brought into operative connection with the main cylinder (not illustrated).

In this example embodiment, the stop 30 is formed by a resiliently yieldable collar part 114 which is secured to the plunger shaft 106. To this end, the collar 114, which is preferably of spring steel, has a sleeve portion 118 which is provided with an internal thread 116 and is screwed onto an external thread 120 made on the plunger shaft 106 close to the plunger plate 108. By means of this screw connection, the axial position of the stop 30 on the plunger shaft 106 is adjustable when the vacuum servo brake 10 is assembled, as will be described below. In order, once the stop 30 has been adjusted, to secure it additionally in its defined position on the plunger shaft 106, further securing measures may be taken. For example, the sleeve portion 118 of the collar part 114 may be crimped to the plunger shaft 106 in the adjusted position of the former. It is also possible to provide the sleeve portion 118 of the collar part 114 with a synthetic insert (not illustrated), in the manner of a self-locking nut, into which the external thread 120 on the plunger shaft 106 cuts when the collar part 114 is mounted on the plunger shaft 106, or to secure the screw connection between the plunger shaft 106 and the collar part 114 using an adhesive.

An annular, resiliently yieldable collar portion 122 extends radially outwards away from the right-hand end, as seen in FIG. 2, of the sleeve portion 118 of the collar part 114 and can come into resilient abutment against the annular end face 50 of the insert part 40 in the working piston 24 when the vacuum servo brake 10 is in operation by means of a radially external edge of its end face facing the plunger plate 108, in order to alter the amplification ratio of the vacuum servo brake 10.

In the first example embodiment, illustrated in FIGS. 1 to 3, the volume take-up means or free space 32 is provided on the output member side, for which purpose the plunger plate 108 is provided on its side facing the reaction disc 28 with a shoulder 124 having a smaller diameter than the rest of the plunger plate 108, this shoulder 124 abutting flat against the reaction disc 28 by means of its end face 126. The shoulder 124 delimits the annular free space 32 radially inwards by means of its external peripheral face 128, which widens conically slightly in the direction of the plunger shaft 106. The free space 32 is delimited radially outwards by the internal peripheral face of the hollow cylindrical portion 42, of larger diameter, of the insert part 40 in the working piston 24. The height or thickness of the shoulder 124 is selected such that the part of the reaction disc 28 which is displaced or moved into the free space 32 on operation of the vacuum servo brake 10 cannot come into abutment against that annular face 130 of the plunger plate 108 which projects radially outwards by comparison with the shoulder 124 and which delimits the free space 32 in the direction of the force, that is to say to the left as seen in FIG. 2. Finally, a ramp 132 is provided between the end face 126 and the external peripheral face 128 of the shoulder 124, and this ramp 132 favors the flow or compression of the reaction disc 28 under load and creates angles which are gentle on the reaction member, because they are obtuse, between the end face 126 and the external peripheral face 128 of the shoulder 124.

Figure 8:
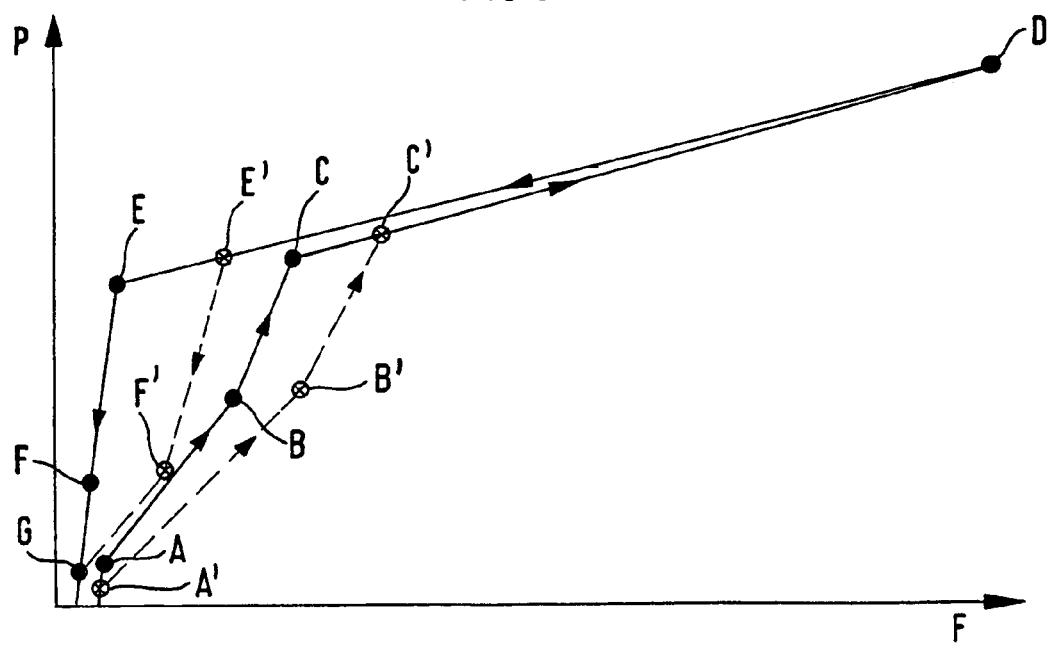
FIG. 8 shows the dual rate characteristic of a vacuum servo brake according to the invention, as a graph of the braking pressure p over the input or pedal force F in an idealised illustration, in which the solid line represents the characteristic with a "dry" reaction member and the dashed line represents the characteristic with a "lubricated" reaction member.

Functioning of the vacuum servo brake 10 which has been described with reference to FIGS. 1 to 3 will be explained below, with reference also being made to FIG. 8. It should first of all be noted that the dual rate characteristics illustrated in FIG. 8 are in idealised form and in reality are more rounded, in particular in the region of the kinks.

If no input force F is exerted on the brake pedal and hence on the piston rod 16, then the restoring spring 34 displaces or presses the working piston 24 to the right, as seen in FIG. 1, without a vacuum being applied to the vacuum chamber 20 by, for example, the intake manifold of an internal combustion engine. The first valve seat 58 formed on the working piston 24, in the present example embodiment the radially inner valve seat 58, at the same time raises the valve part 90 of the valve arrangement 14 away from the second valve seat 76, in the present example embodiment the radially outer valve seat 76, on the control piston 12 in opposition to the force of the valve spring 98.

If a vacuum is then applied to the vacuum chamber 20, a pressure difference is built up between the vacuum chamber 20 and the working chamber 18, which is connected via the still open valve arrangement 14 to the outside and hence to atmospheric pressure. This pressure difference exerts a force directed to the left, as seen in FIG. 1, via the face of the diaphragm disc 52. As soon as this force has risen high enough to be larger than the pre-tensioning forces of the restoring spring 34 and a spring in the main cylinder, the working piston 24 and hence the sealing portion 94 of the valve part 90 which lies on the first valve seat 58 are moved to the left as seen in FIG. 1. This movement continues until the sealing portion 94 of the valve part 90 comes into abutment against the second valve seat 76 on the control piston 24 and hence separates the working chamber 18 from the outside.

The pressure in the vacuum chamber 20, which continues to fall, has the effect that the first valve seat 58 is easily raised away from the sealing portion 94 of the valve part 90 and so the working chamber 18 is also evacuated. This procedure continues until the full vacuum supplied by the internal combustion engine prevails in the vacuum chamber 20. Between the vacuum chamber 20 and the working chamber 18 there now prevails only a small pressure difference; the vacuum servo brake 10 is located in the driving or operating position illustrated in FIGS. 1 and 2, in which the sealing portion 94 of the valve part 90 floats on the valve seats 58, 76. In this position, the end face 102 of the transmission disc 48 guided in the insert part 40 of the working piston 24 is still spaced from the reaction disc 28 or abuts loosely against the reaction disc 28. On the output side, the stop 30 on the plunger 26 abutting against the reaction disc 28 is spaced in defined manner from the end face 50 on the left, as seen in FIG. 1, of the insert part 40 in the working piston 24.

When the brake pedal is actuated, the control piston 12 is then displaced to the left, as seen in FIG. 1, by way of the piston rod 16, and the second valve seat 76 is raised away from the sealing portion 94 of the valve part 90. As the outside air flows into the working chamber 18 from the outside, the pressure difference at the working piston 24 rises. The pressure difference brings about a force which is transmitted to the spring-pretensioned main cylinder by way of the reaction disc 28, lying in annular manner on the annular shoulder portion 46 of the insert part 40 in the working piston 24, and the plunger 26. This means the reaction disc 28 is acted upon with pressure over its full surface from the left, as seen in FIG. 1, by the end face 126 on the shoulder 124 of the plunger 26 and from the right in annular manner at the support face on the annular shoulder portion 46 of the insert part 40, leading to a deformation of the elastomeric reaction disc 28. During this, a small part of the reaction disc 28 is already displaced into the annular free space 32 at this stage, while a further part of the reaction disc 28 in the center of the working piston 24 yields in the direction of the end face 102 of the transmission disc 48, which has been pushed by way of the thrust piece 60 and the thrust plate 100 where appropriate in the direction of the reaction disc 28.

Point A in FIG. 8 represents the condition of the vacuum servo brake 10 also described as a sudden jump in pressure, at which the end face 102 of the transmission disc 48 comes into abutment over its full surface and with pressure against the reaction disc 28, and the servo support of the vacuum servo brake 10 begins, as a result of which the characteristic extends on at a gradient which is determined among other things by the internal amplification ratio of the vacuum servo brake 10, that is to say in the lower region of the dual rate characteristic the ratio of the surface areas of the end faces 126, 102 on the plunger 26 and the transmission disc 48 respectively. By way of the abutment of the transmission disc 48 against the reaction disc 28, the control piston 12 abutting against the transmission disc 48 by way of the thrust disc 100 is displaced in relation to the control housing 36 of the working piston 24 until the valve arrangement 14 closes again at the second valve seat 76. An equilibrium of forces is established between the plunger force and the restoring force on the one hand, and the servo force acting on the working piston 24 and the input force F acting on the thrust disc 100 on the other. As a result of briefly opening the second valve seat 76, a mixed pressure is established in the working chamber 18. The braking pressure p can then be adjusted between A and B in proportional relationship with respect to the pedal force and the input force F, with the valve part 90 floating on the valve seats 58, 76 with a constant input variable.

As the input force F increases, more of the reaction disc 28 is displaced or moved into the free space 32, so that the spacing between the end face 126 on the plunger 26 and the annular face facing the reaction disc 28 on the annular shoulder portion 46 of the insert part 40 in the working piston 24 is lessened, that is to say that the reaction disc 28 becomes "thinner" in the main part. As a result of this, the stop 30 on the plunger 26 comes closer to the end face 50 on the insert part 40 until it comes into abutment against the latter at a predetermined input force F. This condition is represented by point B in FIG. 8.

Because the stop 30 abuts against the end face 50, the internal amplification ratio of the vacuum servo brake 10 is altered such that its characteristic extends more steeply from point B onwards. The amplification ratio does not become infinite, however, that is to say the upper region B-C of the dual rate characteristic does not extend parallel to the p axis, because the stop 30 can yield resiliently if the input force F is further increased and hence the servo force is further increased. As the characteristic extends further, therefore, an increase in the servo force in a manner proportional to the input force F is again possible, with a relatively small increase in the input force F being sufficient to achieve a more significant increase in the servo support than is the case in the lower region A–B of the dual rate characteristic, as is desirable in emergency stop situations. In the upper region B–C of the dual rate characteristic, too, as the input force F increases and hence the servo force increases, more of the reaction disc 28 is moved or displaced into the free space 32 without, however, coming up against the annular face 130 of the plunger plate 108, so that—and this is now true even in opposition to the spring force of the collar portion 122 of the collar part 114—a further axial approach between the end face 126 on the plunger 26 and that annular face on the annular shoulder portion 46 of the insert part 40 facing the reaction disc 28 is possible. The valve part 90 in this case continues to cooperate, as described above, with the valve seats 58, 76 in order to adjust the mixed pressure in the working chamber 18.

Point C in FIG. 8 represents the so-called trigger point of the vacuum servo brake 10, above which a further increase in pressure is only possible by increasing the input force F without further increasing the servo force, and for this reason the characteristic extends at a markedly flatter gradient in the region C–D. It should be mentioned in this context that even in the triggered condition of the vacuum servo brake 10, the thrust disc 100 on the thrust piece 60 of the control piston 12 is spaced from the hollow cylindrical portion 44 of the insert part 40 in the working piston 24.

If for example at D in FIG. 8 the input force F is now reduced again, the braking pressure p returns to zero via E, F and G with hysteresis. During this, the restoring spring 34, and initially, that is to say until the stop 30 disengages from the end face 50 at F in FIG. 8, the springing-back collar portion 122 of the collar part 114 too, shift the working piston 24 to the right as seen in FIGS. 1 and 2 into its initial position, while the control piston 12 is displaced to the right as seen in FIG. 1 by the valve spring 62 until the valve part 90 comes to lie against the second valve seat 76. At the same time, the first valve seat 58 is raised away from the valve part 90. The procedure of evacuating the working chamber 18 continues until the vacuum servo brake 10 is back in its driving or operating position. As the working piston 24 and control piston 12 perform the return movement, the reaction disc 28 is also relieved of pressure and hence, as a result of its restoring capability inherent in the elastomer, tends to withdraw from the free space 32 and adopt its original cylindrical shape again. At G in FIG. 8, the transmission disc 48 is disengaged from the pressure of the reaction disc 28. As a result, the braking pressure p in the region A–B–C–E–F–G of the characteristic can be adjusted with servo support and two different amplification ratios (dual rate characteristic).

By way of explanation it should be noted in this context that a reduction in the input force F in the lower region A–B of the characteristic has the result that the characteristic "returns" to a point in the characteristic range F–G, whereas if the input force F is increased in the upper region B–C of the characteristic it "returns" to a point in the characteristic range E–F.

FIG. 8 also illustrates how the profile of the characteristic (p=f(F)) of the vacuum servo brake 10 can be influenced by the reaction disc 28 not being inserted into the insert part 40 in the working piston 24 "dry" but being lubricated before it is inserted, with a lubrication paste such as one based on fats with solid constituents such as Teflon or graphite, and/or being provided with a lubricant coating and/or having non-stick agent mixed with the elastomer of the reaction disc 28. This "lubricated" condition of the reaction disc 28 is represented by the profile of the characteristic A'–B'–C'–D–E'–F'–G illustrated (partly) in dashed lines in FIG. 8.

As can be seen from FIG. 8, the "lubrication" mentioned above of the reaction disc 28 on the one hand results in a certain flattening of the characteristic. On the other hand, "lubrication" of the reaction disc 28 makes the hysteresis of the characteristic narrower, that is to say that when the vacuum servo brake 10 is relieved of its load the profile of the characteristic E'–F'–G matches the profile of the characteristic A'–B'–C' when the vacuum servo brake 10 is under load better—by comparison with the profile of the characteristic with a "dry" reaction disc 28—which has the effect that a better pedal feel is attained. The narrower hysteresis of the characteristic with a "lubricated" reaction disc 28 can be attributed to the fact that when the reaction disc 28 is displaced into the free space 32 and when the reaction disc 28 is automatically deformed back, as a result of its as restoring capability inherent in the elastomer smaller friction forces act on the reaction disc 28 because of the reduced friction coefficient.

In the example embodiment illustrated in FIGS. 1 to 3, the position of the "kink" point B of the dual rate characteristic can advantageously be adjusted using the stop 30 when the vacuum servo brake 10 is assembled, to which end the screw connection 116, 120 between the plunger 106 and the sleeve portion 118 of the collar part 114 is provided. To adjust the stop 30, the vacuum servo brake 10, which is fully assembled apart from the collar part 114 on the plunger 26, is laid in a device (not illustrated) which can apply a defined input force in the axial direction to the piston rod 16 on the input side of the vacuum servo brake 10. On the output side of the vacuum servo brake 10 the housing 22 is sealed at a flange 134 for the main cylinder, with the result that a vacuum can be applied to the vacuum chamber 20. The plunger 26 is supported against the thrust cap 110 by means of a stop (not illustrated) of the device which simulates the main cylinder and its reaction forces. Furthermore, the device has a screwdriver (not illustrated) surrounding the plunger 26, and this screwdriver can extend through the flange 134 of the housing 22 into the vacuum-chamber 20 and the collar part 114 can be turned thereby.

To adjust the stop 30 and hence the "kink" point B, a vacuum is now applied to the vacuum chamber 20 and the input force F, at which the dual rate characteristic is supposed to switch over from the lower characteristic range A–B to the upper characteristic range B–C, is applied to the vacuum servo brake 10. During this, the valve arrangement 14 operates as described above, as a result of which an equilibrium of forces is established for the predetermined input force F in the vacuum servo brake 10, at which the control piston 12 and the plunger 26 are each shifted with respect to the working piston 24 and the reaction disc 28 undergoes a corresponding deformation. The collar part 114, which is initially screwed only to a small extent onto the external thread 120 on the plunger shaft 106, is then turned by the screwdriver and hence screwed further onto the plunger shaft 106 until the collar portion 122 of the collar part 114 comes into abutment against the end face 50 of the insert part 40 in the working piston 24. This may for example be fixed by means of monitoring the torque of the screwdriver. If appropriate, the collar part 114 on the plunger shaft 106 then has to be secured to prevent unintentional twisting, for example by crimping the sleeve portion 118 to the plunger shaft 106. Before or after this, the piston rod 16 may be relieved of load and the vacuum switched off, whereupon the vacuum servo brake 10, whereof adjustments to the respective requirements are complete, can be removed from the device. This procedure has the advantage among other things that any tolerances in shape, position and/or material, in particular of the reaction disc 28, are compensated automatically. It is thus possible to dispense with complicated pre-sorting for example of the reaction discs 28 by their dimensional stability or properties.

Figure 4:
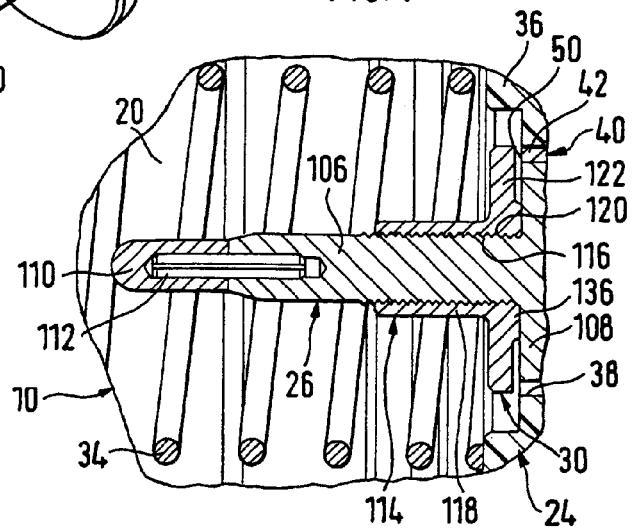
FIG. 4 shows an enlarged partial view in longitudinal section of a vacuum servo brake, in accordance with a variant on the first example embodiment in which the axial position of the stop for the working piston of the vacuum servo brake is adjusted in a different way.

FIG. 4 shows a variant on the first example embodiment of the vacuum servo brake 10 which was described with reference to FIGS. 1 to 3, which will only be described below in respects which differ from the first example embodiment, with like or corresponding parts being provided with like reference numerals to those of the first example embodiment. In this variant, in particular the axial adjustment of the stop 30 when the vacuum servo brake 10 is assembled is performed in a different way to that described above.

For this, the collar portion 122 of the collar part 114 which forms the stop 30 is provided on its side facing the plunger plate 108 with a shoulder 136 which, in the mounted condition of the collar part 114 shown in FIG. 4, abuts fixedly against the side of the plunger plate 108 remote from the reaction disc 28. Here, the height of the shoulder 136 is used to adjust the axial travel of the plunger plate 108 which the latter can cover in moving from its driving or operating position, illustrated here, when part of the reaction disc 28 is displaced into the free space 32, until the collar portion 122 abuts against the end face 50 of the hollow cylindrical portion 42 of the insert part 40 in the working piston 24 of larger diameter, in order to alter the amplification ratio of the vacuum servo brake 10.

With this variant, in the device described above for the final assembly of the vacuum servo brake 10, the relative travel is measured which the working piston 24 covers in moving from its driving or operating position relative to the plunger 26 until it has adopted a position in which an equilibrium of forces prevails there for the predetermined input force F at which the dual rate characteristic is supposed to switch over from the lower characteristic range A–B to the upper characteristic range B–C. In accordance with the relative travel measured for the working piston 24 in relation to the plunger 26, the shoulder 136 is then machined in a machine tool (not illustrated) linked to the assembly device from a semifinished article to give it a defined height for the collar part 114, for example by a machining lathing operation. Once the vacuum servo brake 10 has been taken out of the assembly device, all that needs to be done in order to complete the vacuum servo brake 10 is for the collar part 114, whereof the special machining for this vacuum servo brake 10 is complete, to be screwed onto the plunger 26 until it abuts against the plunger plate 108 and if appropriate to be secured in this position to prevent unintentional detachment. Here too, any tolerances in shape, position and/or material, in particular of the reaction disc 28, are thus compensated automatically.

The collar part 114 according to FIG. 4 moreover has, by comparison with the collar part 114 according to FIG. 2, a collar portion 122 which is thicker in the axial direction—here with the thickness illustrated in somewhat exaggerated manner. It can be seen that the thickness of the collar portion 122 can be used to adjust the resilient properties of the stop 30 in accordance with the respective requirements, as a result of which the gradient of the dual rate characteristic in the upper characteristic range B–C can be influenced.

Figure 5:
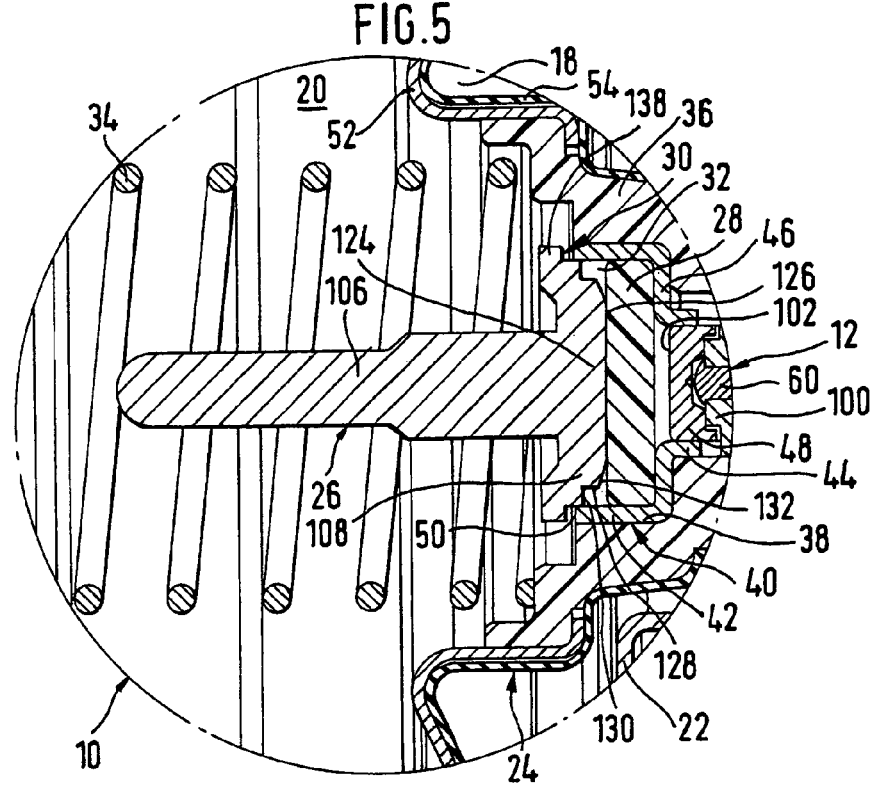
FIG. 5 shows a detailed sectional view, corresponding to the detail of the illustration in FIG. 2, of a vacuum servo brake in a second example embodiment.
Figure 6:
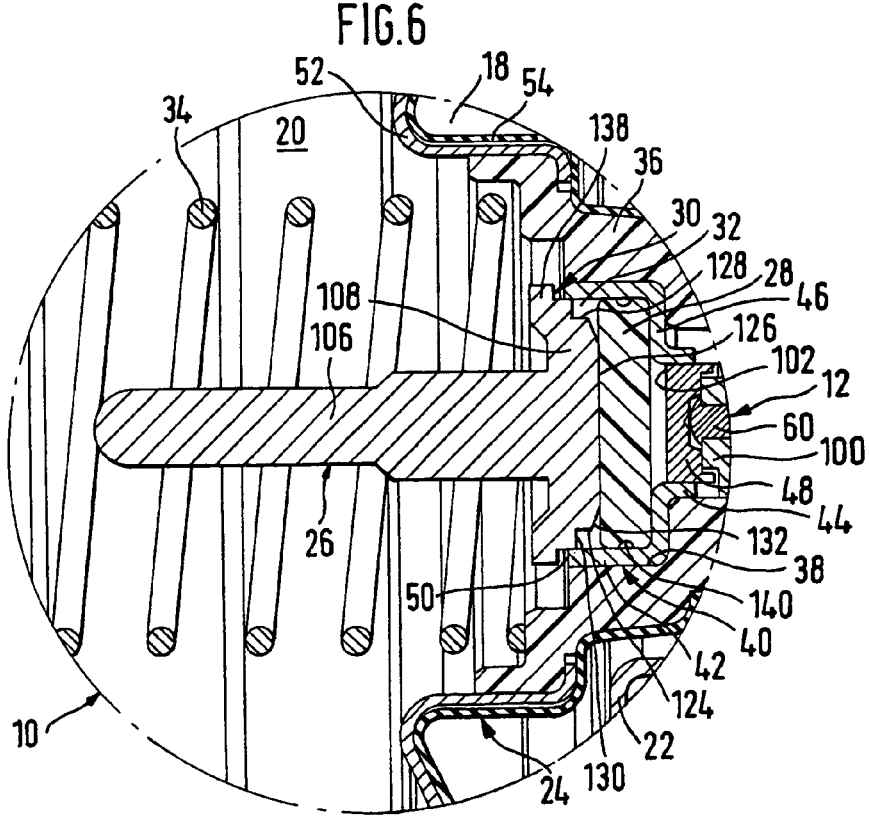
FIG. 6 shows a detailed sectional view, corresponding to FIG. 5, of the vacuum servo brake in accordance with the second example embodiment, with a first variant on the reaction member.
Figure 7:
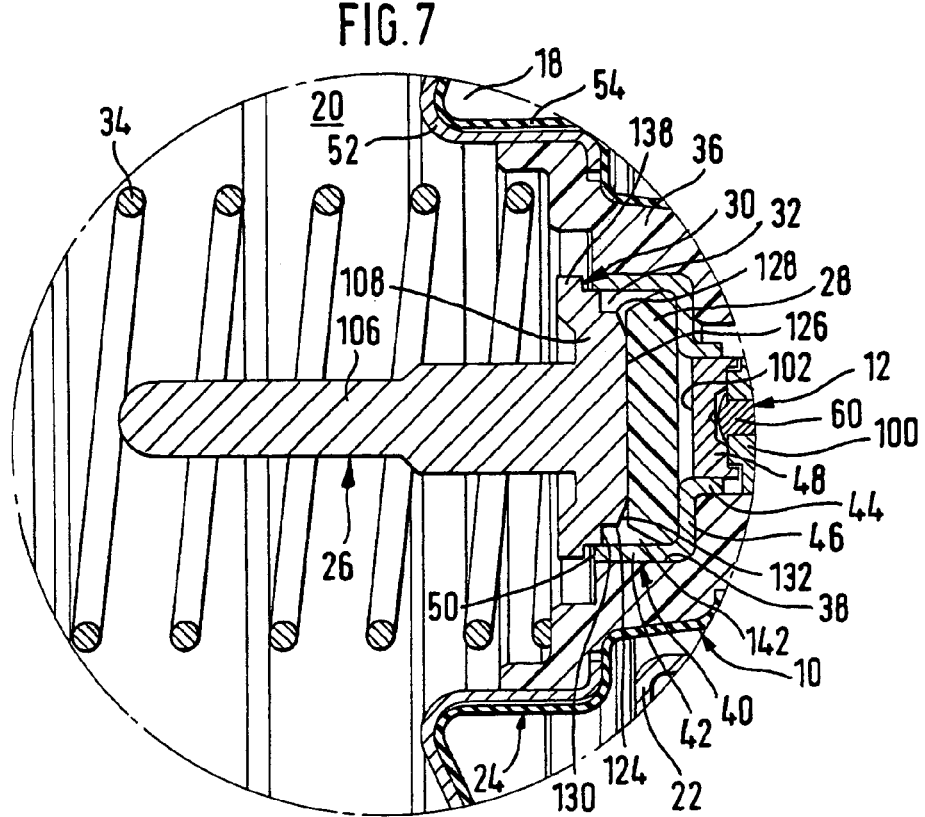
FIG. 7 shows a detailed sectional view, corresponding to FIG. 5, of the vacuum servo brake in accordance with the second example embodiment, with a second variant on the reaction member.

FIGS. 5 to 7 show a second example embodiment of the vacuum servo brake 10, which will only be described below in respects which differ from the first example embodiment, with like or corresponding parts being provided with like reference numerals to those of the first example embodiment. The second example embodiment differs from the first example embodiment in the construction of the stop 30. Moreover, FIGS. 6 and 7 illustrate how at least one volume take-up means may (also) be provided on the reaction disc 28, whereas the solid cylindrical reaction disc 28 shown in FIG. 5 corresponds to the reaction disc 28 of the first example embodiment.

According to FIG. 5, the output member of the vacuum servo brake 10 is a one-part, preferably metal, plunger 26 which also has a plunger shaft 106 which may be brought into operative connection with the main cylinder and a plunger plate 108 abutting against the reaction disc 28. Instead of the collar part 114 in the first example embodiment, in the second example embodiment the plunger plate 108—here with the thickness illustrated in somewhat exaggerated manner—is resiliently yieldable. In the second example embodiment, the stop 30 which may be brought into abutment against the end face 50 of the insert part 40 in the working piston 24 in order to switch the dual rate characteristic over from the lower characteristic range A–B to the upper characteristic range B–C is formed by a collar portion 138 mounted on the external periphery of the plunger plate 108.

Adjustment of the dimension of the stop is performed here in a manner similar to the procedure for the variant on the first example embodiment according to FIG. 4. Accordingly, in the device for the final assembly of the vacuum servo brake 10, that relative travel is measured between the working piston 24 and a stop abutting against the reaction disc 28, which simulates the plunger 26, which the working piston 24 has covered during a movement out of the driving or operating position into the position in which an equilibrium of forces is present at the working piston 24 for the input force F required for the desired position of the "kink" point B. Depending on the relative travel measured, the annular collar 138 is then formed at a predetermined axial position on the external periphery of the plunger plate 108 of a semifinished item for the plunger 26 in a machine tool linked to the assembly device. The spring action of the stop 30 can in this case be adjusted in accordance with the respective requirements by the thickness of the plunger plate 108 which is left on machining. Once the vacuum servo brake 10 has been taken out of the assembly device, all that needs to be done in order to complete the vacuum servo brake 10 is for the plunger 26, whereof the special machining for this vacuum servo brake 10 is complete, to be inserted into the latter.

FIG. 6 shows the second example embodiment with a first variant on the reaction disc 28, which is a substantially cylindrical disc on the external periphery of which, which abuts against the hollow cylindrical portion 42 of the insert part 40 in the working piston 24 which is of larger diameter, a peripheral recess 140 is made as a further volume take-up means into which part of the reaction disc 28 can be displaced when pressure acts on it. The peripheral recess 140, which has a semi-circular cross-section for the purpose of improving the flow and compressive behaviour of the reaction disc 28, is arranged in the center as seen in the axial direction, which means that the reaction disc 28 is constructed to be symmetrical about a notional plane parallel to its end faces. This allows the reaction disc 28 to be mounted in either direction.

Finally, in FIG. 7 the second example embodiment is illustrated with a second variant on the reaction disc 28. In this variant, the reaction disc 28 is bevelled towards its end face abutting against the end face 126 of the plunger 26 in the shape of a truncated cone, in order to form, instead of the recess 140 in the first variant described with reference to FIG. 6, an annular free space 142 as a further volume take-up means which has a wedge shape as seen in cross-section.

It will be clear to those skilled in the art that the position, number, size and/or geometry of the (singular or plural) volume take-up means can be used in conjunction with the material properties, in particular the hardness of the elastomeric reaction disc, and in accordance with the respective requirements in a simple way to influence the flow and compressive behaviour of the reaction disc and hence both the gradient of the dual rate characteristic and the position of the "kink" point B of the dual rate characteristic. Thus, the (singular or plural) volume take-up means may, in contrast to the example embodiments described above, also be provided only on the reaction disc, while the plunger plate has a planar end face facing the reaction disc whereof the external diameter is only slightly smaller than the internal diameter of the hollow cylindrical portion of the insert part in the working piston of larger diameter. In principle, the more easily the reaction disc can be deformed as a result of the (singular or plural) volume take-up means, the smaller the input force F at which the stop comes into abutment against the working piston and hence the dual rate characteristic "kinks" upwards. Thus, in the variants in accordance with FIGS. 6 and 7, the dual rate characteristic "kinks" upwards at a smaller input force F than in the variant in accordance with FIG. 5.

Although only example embodiments of the vacuum servo brake 10 which have a so-called "externally controlled" valve arrangement 14 are described above, that is to say ones in which the valve seat 76 on the input member side lies radially outside, it will be clear to those skilled in the art that the construction described for the vacuum servo brake 10 to generate the dual rate characteristic (volume take-up means for the reaction member/resilient and where appropriate axially adjustable stop) can of course also be used with vacuum servo brakes which have a so-called "internally controlled" valve arrangement, that is to say ones in which the valve seat on the input member side lies radially inside, as for example in the prior art according to EP 0 705 190 B1 or EP 1 123 849 A2.

A vacuum servo brake is disclosed which has an input member by means of which a valve arrangement may be acted upon at an input force in order to connect a working chamber selectively to the outside or to a vacuum chamber. The latter is separated from the working chamber by a working piston which may be brought into operative connection with a main cylinder via an output member in order to generate a braking pressure. Provided on the working piston is an elastomeric reaction member through which a reaction force may be applied to the input member. The output member has a stop which, in the event of a predetermined input force, comes into abutment against the working piston to alter an amplification ratio of the vacuum servo brake. According to the invention, arranged adjacent to the reaction member is at least one volume take-up means into which part of the reaction member may be displaced in the event of the vacuum servo brake being actuated. Furthermore, the stop is preferably of resilient construction. As a result, a vacuum servo brake with dual rate characteristic which is of simple construction and avoids the functional disadvantages of the prior art is provided.

We claim:

1. A vacuum servo brake for a booster brake system for motor vehicles, having an input member, by means of which a valve arrangement may be acted upon at an input force (F) in order to connect a working chamber selectively to the outside or to a vacuum chamber which is separated from the working chamber by a working piston which may be brought into operative connection with a main cylinder via an output member in order to generate a braking pressure (p) and on which there is provided an elastomeric reaction member through which a reaction force dependent on the braking pressure may be applied to the input member, in which the output member has a stop which, in the event of a predetermined input force (F), comes into abutment against the working piston to alter an amplification ratio of the vacuum servo brake;
   wherein, arranged adjacent to the elastomeric reaction member is at least one volume take-up means into which part of the elastomeric reaction member can flow in the event of the vacuum servo brake being actuated, said volume take-up means enabling an axial relative movement between the stop and the working piston so that the stop can come into abutment against the working piston in order to increase the amplification ratio of the vacuum servo brake, and
   wherein at least one of the stop and the working piston is of resilient construction in a region in which the stop abuts so that, when the stop abuts against the working piston, an axial relative movement between the output member and the working piston is still possible while further part of the elastomeric reaction member flows into the volume take-up means.

2. A vacuum servo brake according to claim 1, wherein at least one volume take-up means is provided on the output member.

3. A vacuum servo brake according to claim 2, wherein the output member has a shoulder which abuts against the reaction member by means of an end face and whereof the external peripheral face delimits an annular free space as the volume take-up means.

4. A vacuum servo brake according to claim 3, wherein the output member is provided between the end face and the external peripheral face of the shoulder with a ramp.

5. A vacuum servo brake according to claim 1, wherein at least one volume take-up means is provided on the reaction member.

6. A vacuum servo brake according to claim 5, wherein the reaction member is a disc which is substantially cylindrical and has an external periphery on which a peripheral recess is provided to form the volume take-up means.

7. A vacuum servo brake according to claim 6, wherein the peripheral recess has a semicircular cross-section.

8. A vacuum servo brake for a booster brake system for motor vehicles, having an input member, by means of which a valve arrangement may be acted upon at an input force (F) in order to connect a working chamber selectively to the outside or to a vacuum chamber which is separated from the working chamber by a working piston which may be brought into operative connection with a main cylinder via an output member in order to generate a braking pressure (p) and on which there is provided an elastomeric reaction member through which a reaction force dependent on the braking pressure may be applied to the input member, in which the output member has a stop which, in the event of a predetermined input force (F), comes into abutment against the working piston to alter an amplification ratio of the vacuum servo brake;
   wherein, arranged adjacent to the reaction member is at least one volume take-up means into which part of the reaction member may be displaced in the event of the vacuum servo brake being actuated,
   wherein at least one of the stop and the working piston is of resilient construction in a region in which the stop abuts so that, when the stop abuts against the working piston, a relative movement between the output member and the working piston is still possible,
   wherein at least one volume take-up means is provided on the reaction member, and
   wherein the reaction member is a disc which is bevelled in the shape of a truncated cone towards at least one of its end faces, in order to form an annular free space forming the volume take-up means.

9. A vacuum servo brake according to claim 1, wherein the reaction member is a disc which is constructed to be symmetrical about a plane parallel to its end faces.

10. A vacuum servo brake for a booster brake system for motor vehicles, having an input member, by means of which a valve arrangement may be acted upon at an input force (F) in order to connect a working chamber selectively to the outside or to a vacuum chamber which is separated from the working chamber by a working piston which may be brought into operative connection with a main cylinder via an output member in order to generate a braking pressure (p) and on which there is provided an elastomeric reaction member through which a reaction force dependent on the braking pressure may be applied to the input member, in which the output member has a stop which, in the event of a predetermined input force (F), comes into abutment against the working piston to alter an amplification ratio of the vacuum servo brake;

wherein, arranged adjacent to the reaction member is at least one volume take-up means into which part of the reaction member may be displaced in the event of the vacuum servo brake being actuated, wherein at least one of the stop and the working piston is of resilient construction in a region in which the stop abuts so that, when the stop abuts against the working piston, a relative movement between the output member and the working piston is still possible, and wherein, when the vacuum servo brake is assembled, the stop is adjustable with respect to its axial position.

11. A vacuum servo brake for a booster brake system for motor vehicles, having an input member, by means of which a valve arrangement may be acted upon at an input force (F) in order to connect a working chamber selectively to the outside or to a vacuum chamber which is separated from the working chamber by a working piston which may be brought into operative connection with a main cylinder via an output member in order to generate a braking pressure (p) and on which there is provided an elastomeric reaction member through which a reaction force dependent on the braking pressure may be applied to the input member, in which the output member has a stop which, in the event of a predetermined input force (F), comes into abutment against the working piston to alter an amplification ratio of the vacuum servo brake;

wherein, arranged adjacent to the reaction member is at least one volume take-up means into which part of the reaction member may be displaced in the event of the vacuum servo brake being actuated, wherein at least one of the stop and the working piston is of resilient construction in a region in which the stop abuts so that, when the stop abuts against the working piston, a relative movement between the output member and the working piston is still possible, and wherein the output member is a plunger which has a plunger shaft which may be brought into operative connection with the main cylinder, and a resiliently yieldable plunger plate abutting against the reaction member, wherein the stop is constructed as an annular collar mounted on the plunger plate.

12. A vacuum servo brake for a booster brake system for motor vehicles, having an input member, by means of which a valve arrangement may be acted upon at an input force (F) in order to connect a working chamber selectively to the outside or to a vacuum chamber which is separated from the working chamber by a working piston which may be brought into operative connection with a main cylinder via an output member in order to generate a braking pressure (p) and on which there is provided an elastomeric reaction member through which a reaction force dependent on the braking pressure may be applied to the input member, in which the output member has a stop which, in the event of a predetermined input force (F), comes into abutment against the working piston to alter an amplification ratio of the vacuum servo brake;

wherein, arranged adjacent to the reaction member is at least one volume take-up means into which part of the reaction member may be displaced in the event of the vacuum servo brake being actuated, wherein at least one of the stop and the working piston is of resilient construction in a region in which the stop abuts so that, when the stop abuts against the working piston, a relative movement between the output member and the working piston is still possible, and wherein the output member is a plunger which has a plunger shaft which may be brought into operative connection with the main cylinder, and a plunger plate abutting against the reaction member, wherein the stop is constructed as a resiliently yieldable collar part secured to the plunger shaft.

13. A vacuum servo brake according to claim 12, wherein the collar part has a sleeve portion which is provided with an internal thread, is screwed onto an external thread made on the plunger shaft and away from which an annular, resiliently yieldable collar portion extends.

14. A vacuum servo brake according to claim 12, wherein the collar part is made from spring steel.

15. A vacuum servo brake for a booster brake system for motor vehicles, having an input member, by means of which a valve arrangement may be acted upon at an input force (F) in order to connect a working chamber selectively to the outside or to a vacuum chamber which is separated from the working chamber by a working piston which may be brought into operative connection with a main cylinder via an output member in order to generate a braking pressure (p) and on which there is provided an elastomeric reaction member through which a reaction force dependent on the braking pressure may be applied to the input member, in which the output member has a stop which, in the event of a predetermined input force (F), comes into abutment against the working piston to alter an amplification ratio of the vacuum servo brake;

wherein, arranged adjacent to the reaction member is at least one volume take-up means into which part of the reaction member may be displaced in the event of the vacuum servo brake being actuated, wherein at least one of the stop and the working piston is of resilient construction in a region in which the stop abuts so that, when the stop abuts against the working piston, a relative movement between the output member and the working piston is still possible, and wherein the working piston has an insert part for receiving the reaction member, with the insert part also being constructed for the purpose of guiding the input member and the output member and having an abutment face for the stop.

16. A vacuum servo brake according to claim 1, wherein the reaction member is lubricated with a lubrication paste.

17. A vacuum servo brake according to claim 1, wherein the reaction member is provided with a lubricant coating.

18. A vacuum servo brake according to claim 1, wherein the reaction member has non-stick agent mixed with the elastomer of the reaction member.

* * * * *